March 26, 1929.  L. W. SIMONS ET AL  1,707,145
SPRING SHACKLE BOLT
Filed June 18, 1927
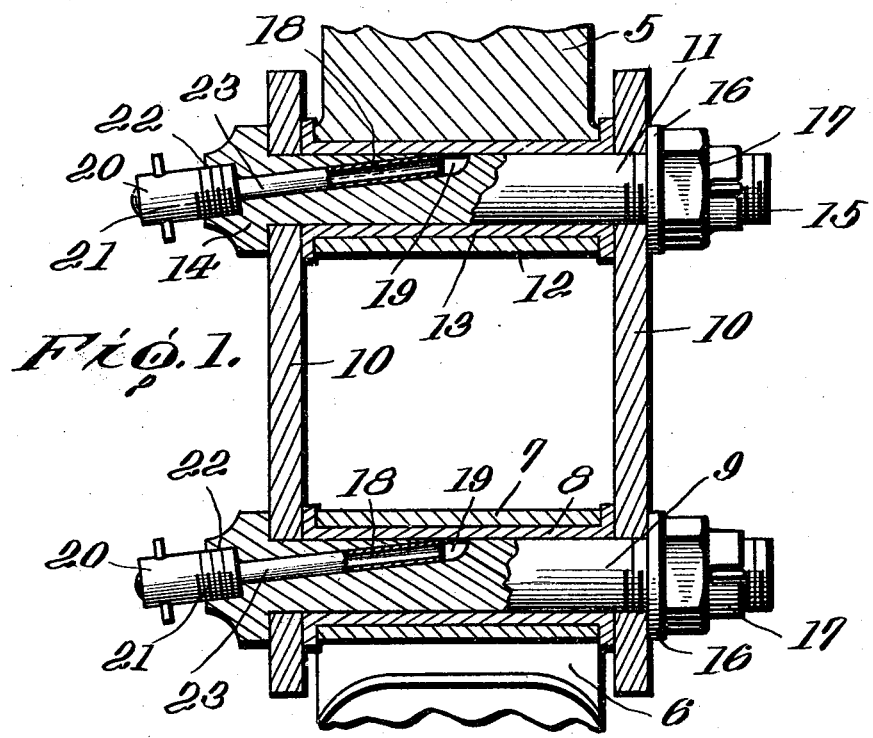
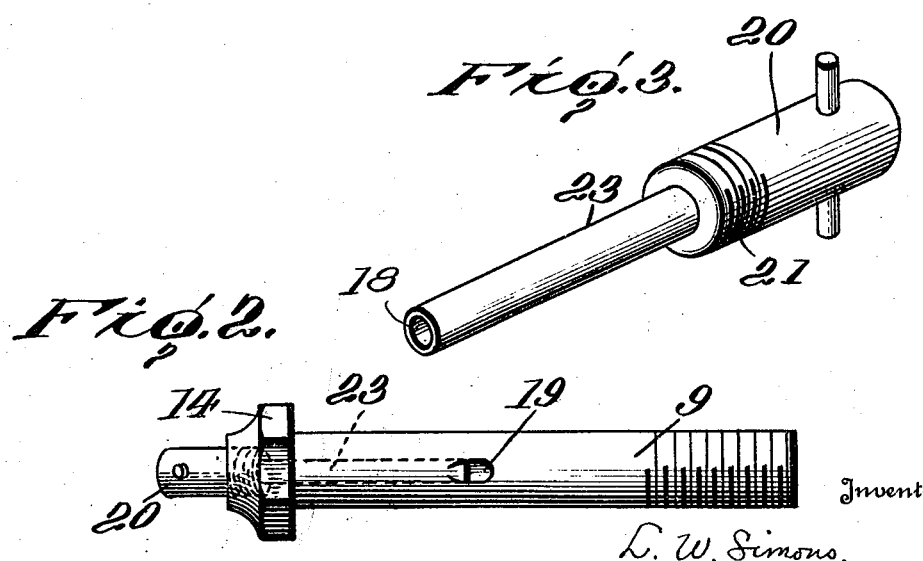
Inventors.
L. W. Simons,
J. H. Bitton,
By A. S. Patterson
Attorneys Patented Mar. 26, 1929.

1,707,145

UNITED STATES PATENT OFFICE.

LOWELL W. SIMONS AND JAMES H. BRITTON, OF MADISON, KANSAS.

SPRING SHACKLE BOLT.

Application filed June 18, 1927. Serial No. 199,760.

This invention relates to improvements in spring shackle bolts and more particularly to the means for lubricating the bolts.

Although the invention is illustrated and described as applied to a shackle bolt such as employed where the spring of a vehicle joins the frame or chassis of the vehicle, it will be readily understood that the inventive idea can be utilized elsewhere without departing from the spirit of the invention.

Shackle bolts now known and in use which are of a construction to be lubricated, have one particular weakness or objection in their operation. It has been found that the oil or grease conduit or passageway in the shackled becomes stopped up or clogged, and prevents a normal or efficient lubrication of the shackle which is of course highly objectionable.

The present invention is designed and constructed to overcome this disadvantage of the present known shackle bolts, and is what we have termed a non-clogged spring shackle bolt.

The primary object of the invention is the provision of a shackle bolt of the lubricated type which is so constructed as to prevent the stopping up or clogging of the lubricant passageway.

It is the aim of the invention to provide a shackle bolt of the lubricated type which is constructed in a manner to permit the easy and ready lubrication of the bolt, and at the same time to so construct the device that in the event the lubricant passageway becomes stopped up, the passageway can be quickly and easily cleaned.

A further object of the invention is the provision of a device of the character described which is cheap and simple of manufacture, and highly efficient in operation.

Other novel features of construction and improved results of the invention will appear from the following description and accompanying drawings.

In the drawings:

Figure 1 is a vertical sectional view through the shackle bolts and spring connection of the vehicle.

Figure 2 is an end view of the spring connection of the vehicle.

Figure 3 is a perspective view of the lubricator and its conveying tube.

Referring now to the drawings, 5 indicates the extending horn or end of the vehicle chassis, while 6 indicates the main or connection leaf of a vehicle spring.

The outer end of the vehicle spring leaf 6 is provided with an eye or bearing 7 adapted to surround and be supported by a bushing 8 which in turn is supported upon the shackle bolt 9. The shackle bolt 9 is supported by the shackle clips 10, the upper ends of which are in engagement with and supported upon the upper shackle bolt 11 which is carried in the eye 12 of the vehicle chassis side frame. A suitable bushing portion 13 is interposed between the upper shackle bolt 11 and the eye 12 of the chassis frame.

Although we have described and illustrated the use of bushings 8 and 13, it will be readily understood that these can be eliminated and a direct connection can be had between the shackle bolts and the spring leaf and vehicle chassis frame.

The shackle bolts 9 and 11 are identical in construction. These bolts have an enlarged head 14 at one end while their opposite ends are threaded as at 15 to receive suitable washers 16 and nuts 17. The enlarged heads of the bolt engage one of the spring shackle clips 10 while the washers and nuts 16 and 17 engage the other spring shackle clip and hold these members in place.

The shackle bolts are provided with a drilled channel or passageway 18 which starts centrally of the enlarged heads of the bolts and extends inwardly and upwardly at an angle and terminates in an elongated groove 19 at one side of the bolt and about intermediate its length.

In the ordinary construction, a suitable fitting is applied to the outer end of the shackle bolt hole 18 so that lubricant can be supplied for passage to the elongated groove.

Such a construction, however, has the disadvantage that when the conduit or passageway becomes clogged, it is necessary to entirely remove the shackle bolt to clean it. If a wire or other like instrument is run into the passageway, it will eventually make the situation worse for the reason that the matter which is clogged up, will be pushed into the elongated groove and eventually prevent any lubrication taking place.

To overcome this disadvantage we have provided a suitable lubricant supplying device or fitting 20. This device can take any desirable form, but in the drawings we have illustrated what is commonly known as alemite fitting which is adapted to cooperate with a grease gun to receive grease under pressure. This fitting is threaded as at 21 and the outer end of the drilled hole in the shackle bolt internally threaded as at 22 to receive the fitting. The fitting additionally is provided at its inner end with a conveying tube 23 which is of a size to fit the drilled hole of the shackle bolt. This tube 23 is rigidly attached to and carried by the fitting 20, so that when the fitting is threaded into the outer end of the shackle bolt tube, it will extend through the hole in the bolt and end at a point adjacent the elongated groove 19.

From the foregoing description it will be seen that lubricant can be easily and readily supplied to the elongated lubricant receiving groove 19 of the shackle bolt and that in the event either the fitting or the tube become clogged, they are easily and readily removed for cleaning.

In the drawings the tube 23 is illustrated as stopping just short of the oil groove 19. It is pointed out, however, that the tube could be readily and easily lengthened and tapered or beveled at its end so as to extend well into the oil groove 19. With a construction of this nature, the remote possibility of the groove becoming clogged is overcome.

We are aware that shackle bolts with a drilled opening are old in the art. It is also old to provide an alemite or other suitable lubricant fitting to the lubricant conduit of the bolt. It is, however, altogether novel, in so far as we are aware, to provide the fitting with a tube extending into the drilled hole of the bolt. The present invention although simple in nature, meets a much needed want and overcomes the chief objection and disadvantage of shackle bolts now known and in use.

Additionally the construction is very simple, and hence cheap of manufacture. Furthermore the invention can be applied to a vast number of shackle bolts now in use without an appreciable amount of labor or work.

Having thus described our invention, what we desire to claim and secure by Letters Patent of the United States is:

1. A shackle or like bolt having a passageway extending obliquely from one end through the side wall thereof, said passageway at its outer end enlarged and internally threaded and at its inner end terminating in an elongated groove, a lubricant receiving fitting having a valve at its outer end and provided with an externally threaded portion, said fitting beyond said threaded portion reduced into an elongated conveyor tube of a diameter slightly less than the diameter of the said bolt passageway, and said fitting threaded into the enlarged threaded end of the passageway with the conveyor tube extending loosely through the bolt passageway to a point adjacent the elongated bolt groove, whereby the fitting and conveyor tube are adapted to convey lubricant to the bolt groove and the fitting and its conveyor tube can be readily and easily removed for cleaning.

2. A lubricator for a shackle bolt comprising a tubular member and a shackle bolt passing through the said member, the said shackle bolt having a straight opening extending from one end thereof to the said tubular member, and a straight tubular oil carrying member extending throughout the shackle bolt opening with both ends open and its outer end provided with an externally exposed valve, the outer end of the shackle bolt opening provided with internal screw threads and the outer end of the tubular oil carrying member externally screw threaded and fitting the said shackle screw-threaded opening, whereby when the said oil carrying member becomes clogged it can be removed from the shackle bolt member, and whereby oil may be inserted through the valve at the outer end of the oil carrying member, substantially as specified.

In testimony whereof we hereunto affix our signatures.

LOWELL W. SIMONS.
JAMES H. BRITTON.